Figure 1:
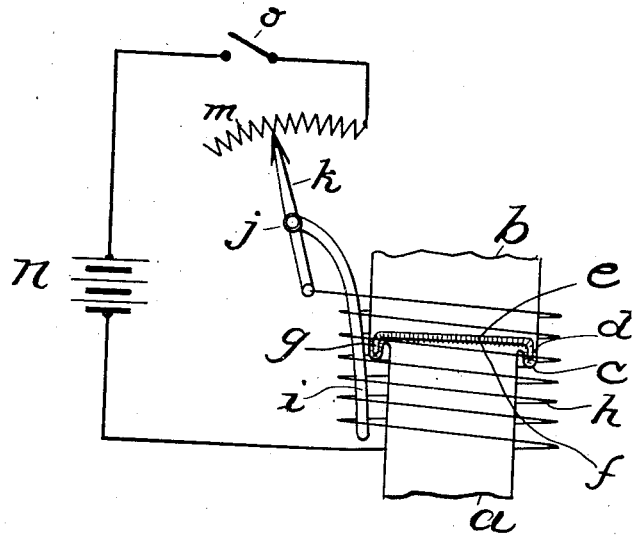

A. HENWOOD.
PROCESS OF CATALYTICALLY COMBINING GASES.
APPLICATION FILED JAN. 9, 1919.

1,347,160.

Patented July 20, 1920.

WITNESS:

INVENTOR
Abraham Henwood
BY
ATTORNEY.

UNITED STATES PATENT OFFICE.

ABRAHAM HENWOOD, OF CYNWYD, PENNSYLVANIA.

PROCESS OF CATALYTICALLY COMBINING GASES.

1,347,160.     Specification of Letters Patent.     Patented July 20, 1920.

Original application filed July 8, 1918, Serial No. 243,758. Divided and this application filed January 9, 1919. Serial No. 270,410.

*To all whom it may concern:*

Be it known that I, ABRAHAM HENWOOD, a citizen of the United States, residing at Cynwyd, county of Montgomery, and State of Pennsylvania, have invented a new and useful Improvement in Processes of Catalytically Combining Gases, of which the following is a full, clear, and exact description, reference being had to the accompanying drawings, which form a part of this specification.

In an application filed by me July 8, 1918, Serial No. 243,758, of which this application is a division, I have set forth a specific construction of catalyzer and a process for oxidizing ammonia to nitric acid by passing ammonia gas and oxygen through such catalyzer. In the same application, and also in an application filed January 9, 1919, Serial No. 270,409 (which is another division of said application Serial No. 243,758) I have described a method of maintaining the temperature at the point of reaction within the range of efficiency and safety by gas control, preferably by excess of oxygen, to maintain the temperature relatively low, and by applying heat by an outside thermostatically-controlled electrical means to maintain the temperature of reaction above the lowest range of permissible temperature to secure maximum concentration of nitric acid but not sufficiently high to permit any substantial decomposition of nitric acid. In said application Serial No. 243,758, I have also described, as a part of the process, the passage of the mixture over or through a catalyzer carrier while maintaining the carrier flexibly supported to provide for its expansion or contraction under the influence of temperature variations. The last named feature of the process forms the subject-matter of the present application.

In the description of the process of the present application, it will be advisable to refer to these other features of the general process, although no claims are herein made thereto.

In carrying out the present process I prefer to pass the oxygen and ammonia gas over or through a continuous porous or permeable contact or reaction surface, or diaphragm, of catalytic material, preferably platinum sponge, the mass of catalytic material being so small as not to be self-sustaining but distributed uniformly over the surface of a porous or permeable material which is preferably non-metallic, non-catalytic, and a poor conductor of heat.

A base or support of such material of any suitable shape, so covered with a coating, film or diaphragm of platinum, is placed in the channel provided for the reaction gases so that the latter must pass over or through the same and hence be brought into reactive contact with the continuous surface of platinum. Thus I attain maximum economy, even distribution, minimum mass and uniform temperature, and insure that practically every molecule of the reaction gases will be subjected, and in the same degree, to the influence of the catalyzer.

In preparing the catalyzer, I take a support, which is preferably in the shape of a disk or hemisphere, but which may have any other suitable shape. The support is of porous or permeable material, such as alundum or silica. The catalytic material, preferably platinum, is deposited, formed or placed, on either or both surfaces of the support, but preferably only on one surface. The catalytic material may be applied in various ways, but I prefer to soak an alundum support in ammonium chlorid, dry it, remove any excess from the surface, spray upon the surface a platinum chlorid solution, thereby forming on the surface a precipitate of ammonium chlorplatinate, and then dry and ignite, thus burning off or volatilizing ammonia, hydrogen chlorid, steam and chlorin, and leaving a superficial layer of platinum sponge. The carrier and catalyzer are then so placed in the reaction chamber that the gases of reaction are compelled to pass through both the diaphragm of platinum sponge and the support or carrier therefor.

To secure a fine and certain adjustment of the temperature, I use sufficient excess oxygen, or, less desirably, sufficiently reduce the gas speed, so that the temperature will tend to border on, or even sink below, the lower limit of the range of permissible temperatures, and then add heat from outside, by automatically-controlled, and preferably thermostatically-controlled, means to maintain the temperature safely above the lower limit of the range of permissible temperatures, thereby offsetting what would otherwise be objectionable depressions of temperature below that at which the reaction takes place advantageously. The heating may be effected by a resistance wire winding arranged in an electric circuit and in proximity to the catalyzer and also to a thermostatic element which is connected to, and operates, a rheostat controlling the flow of electric current, so as to cut out resistance as the temperature decreases and introduce resistance as the temperature increases and break the circuit altogether at any desired upper limit of temperature.

While, in the practice of the process, the the temperature, during the reaction process, is maintained fairly even, it is clear that when the process is discontinued, there is a very considerable fall in temperature, and that when the process is again renewed, there is a corresponding great rise in temperature. The result is that the carrier expands and contracts, and it is obvious that, by reason thereof, if the catalytic diaphragm and its carrier were fixedly anchored, serious difficulties would be experienced in carrying out the process, for the reason that the alundum support would crack and open free passage for the gases through or around the support and ultimately cause the disintegration and destruction of the catalyzer. To prevent the cracking of the support due to expansion and contraction resulting from variation of temperature at the beginning and end of a run, the edge of the support may be sustained in a groove containing a plastic lute, composed of a vitreous substance of the proper degree of viscosity at the working temperature, and which is chemically inert to the reaction gases, thereby providing a hermetical seal which allows the support to expand as it is heated and contract as it is cooled. I prefer to use a sustaining seal or lute composed of boric acid. It is this feature of the process which forms the subject-matter of the present application.

While the practice of the process does not depend upon the employment of any particular apparatus, the devices illustrated in the accompanying drawings may be used to carry out the process.

Figure 2:
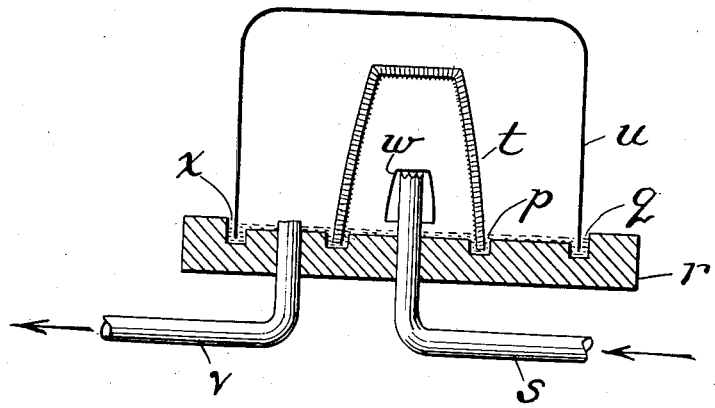

Figure 1 is a diagram of that part of the apparatus which may be conveniently called the reaction chamber, including the thermostatically-controlled outside heating means. Fig. 2 is a similar view of a modification with outside heating means omitted.

In Fig. 1, $a$ and $b$ are two sections of a tube or chamber into which the gases of reaction pass and combine to form nitric acid. The tube, at the junction of the two sections, is bent circumferentially to form a circumferential groove $c$ containing boric acid $d$ or some equivalent substance that is plastic, vitreous, viscous and chemically inert to the gases. The disk-shaped support $e$ composed (say) of silicia, holding distributed over its surface, in a continuous manner, platinum sponge $f$, has a depending peripheral flange $g$ resting in the groove $c$ and embedded in the plastic lute $d$, which, while providing a hermetical seal, allows the disk $e$ to expand and contract. The support is either inherently porous or is provided with perforations which permit the free flow therethrough of gas and acid. It is also adapted to be highly heated without injury and to retain the heat from the reaction taking place at this point.

A resistance wire winding $h$ incloses the tube containing the catalyzer and is coiled also about the stem of a thermostatic element $i$, whose outer end, insulated at $j$, is connected with the arm $k$ of a rheostat $m$, by which the flow of current from a battery $n$ is controlled. A switch $o$ provides for opening the circuit when automatic operation is not desired or required.

In Fig. 2, I show a base $r$ provided with two concentric grooves $p$ and $q$. Through the base extends a gas inlet pipe $s$. A catalyzer support $t$, which may be of alundum and of inverted cup shape, is coated on its inside face with platinum sponge, and rests in the inner groove $p$. A cover $u$, of pyrex glass, overlies and surrounds, and is spaced from, the support $t$ and rests in the groove $q$. An outlet pipe $v$ for the product of the reaction extends through the base $r$ and communicates with the space between the cover $u$ and the support $t$. A hood or deflector $w$ is placed over the mouth of the inlet pipe $s$ to distribute the entering gases within the chamber inclosed by the support $t$ preparatory to their passage through the cup. The lower edge of the cup $t$, resting in the groove $p$, is embedded in a plastic lute $x$ of boric acid or other suitable material. I prefer to flow the boric acid over the surface of the base $r$ so that it will fill and overflow the grooves and provide a protective covering or enamel for the bottom of the reaction chamber.

I do not herein claim the catalyzer and support therefor, nor the process of catalytically combining oxygen and ammonia gas to form nitric acid by passing the mixture through said catalyzer, nor the process of regulating the temperature of reaction. Nor do I claim the apparatus herein described for carrying out the process herein claimed. These other inventions form the subject-matter of separate applications, namely: Serial No. 243,758, filed July 8, 1918; Serial No. 241,724, filed June 25, 1915; and Serial No. 270,409, filed January 9, 1919.

Having now fully described my invention, what I claim and desire to protect by Letters Patent is:

1. The improvement in the art of catalytically combining gases which consists in passing a mixture containing the gases to be combined over a catalyzer supported upon a carrier, and supporting the carrier flexibly to provide for its expansion and contraction under the influence of temperature variations.

2. The improvement in the art of catalytically combining gases which consists in passing a mixture containing the gases to be combined over a catalyzer supported upon a carrier, and applying, in supporting relation to the carrier, a plastic viscous material to yieldingly allow the carrier to expand or contract under the influence of temperature variations.

In testimony of which invention I have hereunto set may hand, at Cynwyd, on this 26th day of December, 1918.

ABRAHAM HENWOOD.